US 6,366,459 B1

(12) United States Patent
Katagiri

(10) Patent No.: US 6,366,459 B1
(45) Date of Patent: Apr. 2, 2002

(54) PORTABLE INFORMATION EQUIPMENT

(75) Inventor: Masayuki Katagiri, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/594,603

(22) Filed: Jun. 15, 2000

(30) Foreign Application Priority Data

Jun. 15, 1999  (JP) .......................................... 11-168565

(51) Int. Cl.$^7$ ................................................ H05K 5/00
(52) U.S. Cl. ...................... 361/686; 361/681; 361/682; 361/683; 341/61; 341/63; 429/96; 429/99; 429/100; 248/535; 248/536
(58) Field of Search .................... 361/686, 681, 361/682, 683; 349/61, 62, 63, 65; 429/96, 99, 100; 248/535, 536, 676

(56) References Cited

U.S. PATENT DOCUMENTS

| 5,107,401 | A | * | 4/1992 | Youn .......................... 361/683 |
| 5,672,108 | A | * | 9/1997 | Lam et al. .................... 463/39 |
| 6,078,496 | A | * | 6/2000 | Oguchi et al. ............... 361/683 |
| 6,128,184 | A | * | 10/2000 | Ito et al. ..................... 361/681 |
| 6,144,368 | A | * | 11/2000 | Ooka et al. .................. 345/161 |
| 6,178,087 | B1 | * | 1/2001 | Cho et al. .................... 361/686 |
| 6,191,941 | B1 | * | 2/2001 | Ito et al. ..................... 361/683 |
| 6,198,626 | B1 | * | 3/2001 | Nakajima et al. ............ 361/686 |
| 6,201,693 | B1 | * | 3/2001 | Kamimaki et al. .......... 361/686 |
| 6,282,082 | B1 | * | 8/2001 | Armitage et al. ............ 361/681 |

FOREIGN PATENT DOCUMENTS

| JP | 62276753 | 12/1987 |
| JP | 08083135 | 3/1996 |

* cited by examiner

Primary Examiner—Leo P. Picard
Assistant Examiner—David Foster
(74) Attorney, Agent, or Firm—Nixon & Vanderhye, P.C.

(57) ABSTRACT

A portable information equipment has a main body portion and a display portion hinged each other. A space is secured in the display portion by using a cabinet for a reflection type liquid crystal display which requires no backlight instead of a liquid crystal display with backlight. The space is used for an additional internal battery. The additional internal battery increases an electric capacity to extend an operation time of the portable information equipment and need no externally attached extension battery.

8 Claims, 4 Drawing Sheets

PORTABLE INFORMATION EQUIPMENT

BACKGROUND OF THE INVENTION

The present invention relates to portable information equipment having a main body portion and a display portion foldably connected so as to be opened and closed.

Portable information equipment such as so-called notebook personal computers and word processors incorporate a chargeable internal battery so as to be able to use the equipment at a location where an alternating current power supply is not available. FIG. 4 shows a constitution of generally known portable information equipment 1. A portable information equipment 1 of such a type includes a main body portion 2 and a display portion 3 hinged each other, and usually an internal battery 4A is disposed at one corner of the main body portion 2.

In any portable information equipment 1 of this type, for the purpose of enhancing the portability of the equipment 1, while thickness reduction and weight reduction of the main body portion 2 and display portion 3 are required, as another important problem to be solved, there is an ardent demand for increasing a capacity of the internal battery 4A and extending a battery life thereof. However, in order to increase the capacity of the internal battery 4A, inevitably it is necessary to enlarge the outer shape of the internal battery 4A; therefore, the capacity of the internal battery 4A is set in consideration of the balance relative to a cabinet 21 of the main body portion 2 in which the internal battery 4A is disposed.

In the case that the battery capacity is insufficient with the internal battery 4A alone, an extension battery 4B as shown in FIG. 5 is externally attached to the main body portion 2 in order to supplement the resulting battery capacity shortage. However, external attachment of the extension battery 4B is considerably detrimental to the portability of the portable information equipment 1.

For a display unit 5 used in the display portion 3 of the portable information equipment 1, a liquid crystal display is generally employed. In the past, transmission type liquid crystal displays with backlight were in a main stream, but in recent years, reflection type liquid crystal displays have also been employed because the reflection type display can provide a clear color display without using any backlight.

FIG. 6 is a fragmentary sectional view showing an edge part of the display portion 3 using a transmission type liquid crystal display 5. The transmission type liquid crystal display 5 comprises a transmission type liquid crystal unit 5A and a backlight unit 5B. The transmission type liquid crystal unit 5A has a laminate of a glass layer 51, a polarizer layer 52, and the like with a liquid crystal layer sandwiched therebetween. The backlight unit 5B is disposed behind the transmission type liquid crystal unit 5A and has a light guide plate 53, a backlight 54, and the like. These units are incorporated into a cabinet 31 of the display portion 3. The thickness of the backlight unit 5B is approximately 3 mm or so.

Whilst, a reflection type liquid crystal display comprises a reflection type liquid crystal unit formed in about the same thickness as that of the transmission type liquid crystal unit 5A so that thickness reduction and weight reduction can be realized to an extent corresponding to omission of the backlight unit 5B, compared with the transmission type liquid crystal display 5. Furthermore, display can be performed through utilization of reflected light from external light and not through illumination by the backlight 54, and this provides for an advantage of substantial reduction of electric power consumption.

However, there are commercial demands for both portable information equipment 1 using a transmission type liquid crystal display 5 and portable information equipment 1 using a reflection type liquid crystal display. As such, manufacturers of portable information equipment 1 are required to prepare and supply both types of products. Therefore, for portable information equipment 1 using reflection type liquid crystal display, despite the fact that the use of reflection type liquid crystal display enables thickness reduction of display portion 3 in relation to portable information equipment 1 using transmission type liquid crystal display 5, manufacturers are still using the cabinet 31 common to both types of display portion 3 of portable information equipment 1 due to cost reduction of development and manufacturing.

SUMMARY OF THE INVENTION

The present invention was developed in view of above described situation and, therefore, it is an object of the present invention to provide a portable information equipment substantially thinned by using a display unit requiring no backlight, wherein a second internal battery is incorporated into the display unit so that sufficient capacity and life of the internal battery are ensured and the utility of the equipment is improved.

In order to achieve the above object, the present invention provides a portable information equipment having a main body portion and a display portion foldably connected so as to be opened and closed, the display portion comprising: a cabinet defining an outline of the display portion; a display unit requiring no backlight unit and housed in the cabinet; and a platy internal battery housed in a space defined between the cabinet and the display unit.

According to this invention, it is possible to increase the capacity of the internal battery, and therefore the useful life of the battery can be extended to enhance the utility of the portable information equipment. In addition, the display unit requires no backlight and consequently the electric power requirement for the display unit can be substantially reduced so that the useful life of the battery can be further extended. The cabinet and the associated peripheral parts in the portable information equipment according to the present invention are also usable for portable information equipment fitted with a backlight, and thereby manufacturing cost of the portable information equipment can be reduced.

In an embodiment of the invention, the space is on a back side of the display unit in the cabinet.

In an embodiment of the invention, the display unit is a reflection type liquid crystal display. Other display units such as an electro-luminescence display, a plasma display and a field effect display may be used as well.

In an embodiment of the invention, the platy internal battery is a lithium polymer battery.

In an embodiment of the invention, the portable information equipment further comprises: a battery control board provided within the cabinet; and a flat cable by which the battery control board is connected to the internal battery.

In an embodiment of the invention, the flat cable is a flexible flat cable or a flexible printed circuit.

According to the embodiment, wiring can be easily conducted in the cabinet of the display portion because the cable is flexible.

In an embodiment of the invention, the portable information equipment further comprises a power supply cable for supplying electric power from the internal battery to the main body portion.

In an embodiment of the invention, the power supply cable includes at least two independent electric wires in a bundle.

According to the embodiment, a bundle of the wires of the power supply cable allow a large current to be supplied to the main body portion and prevents the power supply cable from breaking during opening/closing operation of the display portion.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
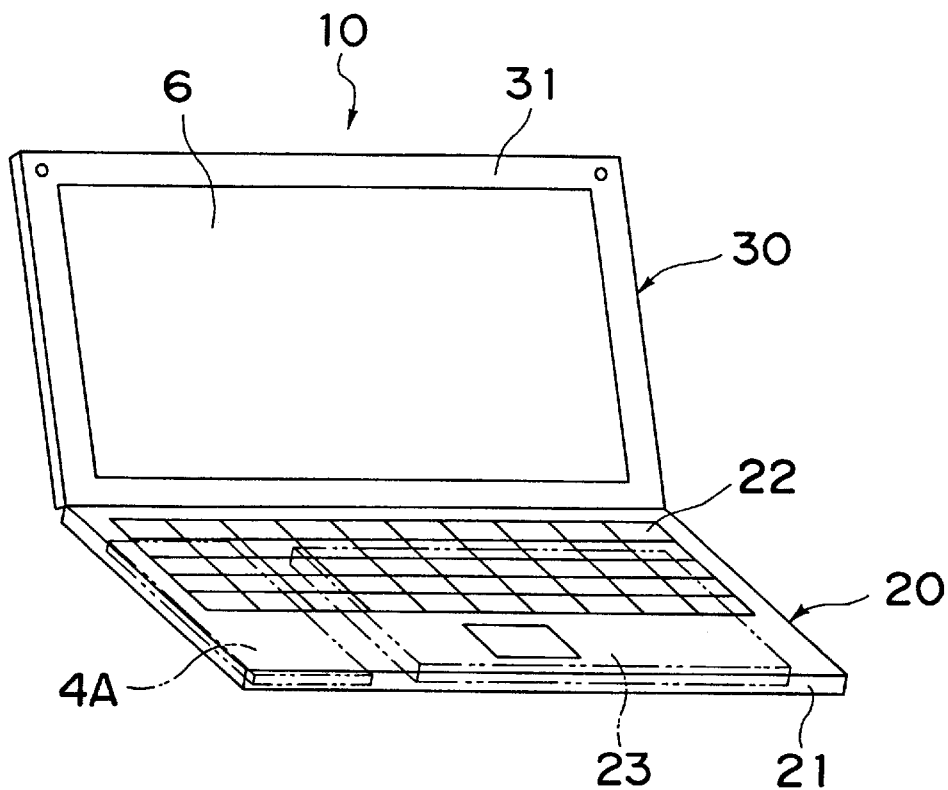
FIG. 1 is a perspective view showing a schematic construction of a portable information equipment of the present invention.

One embodiment of the present invention will now be described with reference to the accompanying drawings. In the following description, with respect to portions and components similar in function to those of the aforesaid conventional portable information equipment 1, common designations and reference numerals are used.

FIG. 1 shows a schematic construction of portable information equipment 10 of the invention. The portable information equipment 10 comprises a main body portion 20 and a display portion 30. When the portable information equipment 10 is not used or is carried, the main body portion 20 and the display portion 30 is closed into unity. When the portable information equipment 10 is used, the main body portion 20 and the display portion 30 are opened to each other to operate the portable information equipment 10 using a keyboard 22 disposed in the main body portion 20. A chargeable first internal battery 4A, together with main board 23 including processing/memory units and the like, is housed in a cabinet 21 of the main body portion 20.

Figure 6:
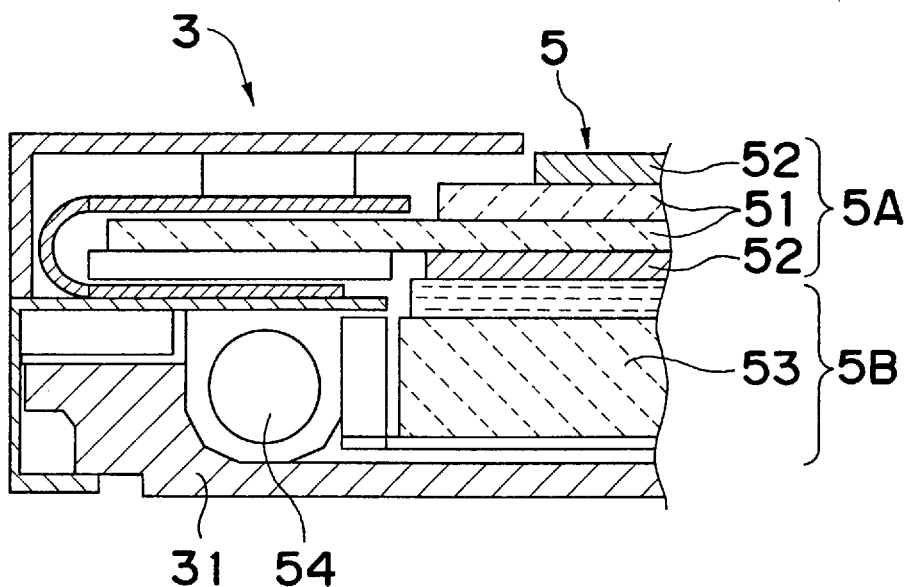
FIG. 6 is a schematic sectional view showing an edge part of a display portion in which a transmission type liquid crystal display is employed.

For the display portion 30 of the portable information equipment 10, a reflection type liquid crystal display 6 is used as a display unit. The reflection type liquid crystal display 6 is incorporated into a cabinet 31. The cabinet 31 can be also used for the aforesaid cabinet 31 which defines the display portion 3 of the portable information equipment 1 employing the liquid crystal display 5 with backlight shown in FIG. 6.

Figure 2:
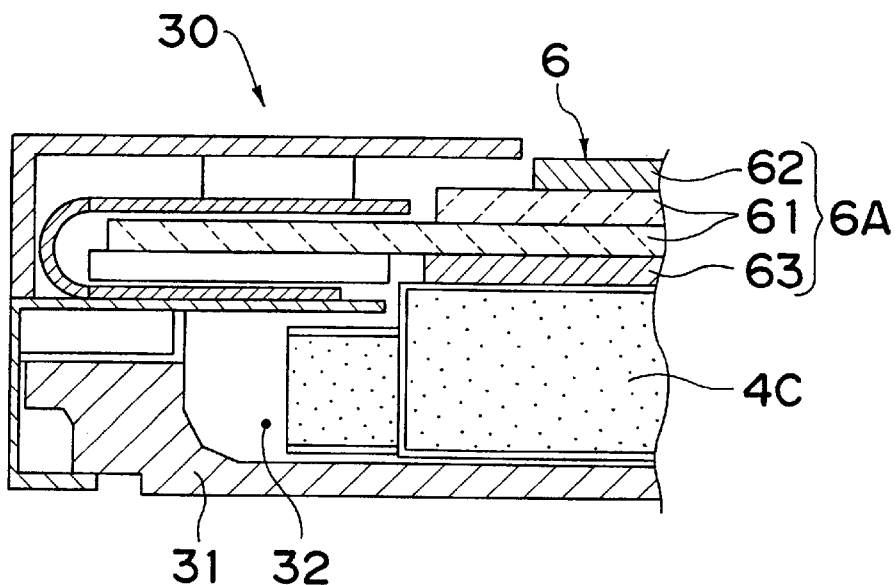
FIG. 2 is a schematic view in section showing a vicinity of a frame of a display portion of the portable information equipment of the present invention.

FIG. 2 is a sectional view showing a part of the structure of the display portion 30. The reflection type liquid crystal display 6 comprises a reflection type liquid crystal unit 6A which is formed in about the same thickness as that of the aforesaid liquid crystal unit 5A of the liquid crystal display 5 with backlight. The reflection type liquid crystal unit 6A comprises glasses 61 stacked with a liquid crystal layer held therebetween, polarizer 62, reflector 63 and the like. Accordingly, between the back surface of the reflection type liquid crystal unit 6A and the inner surface of the cabinet 31, there is formed a battery housing space 32 having a thickness of about 3 mm corresponding to the thickness of the backlight unit 5B of the liquid crystal display 5 with backlight shown in FIG. 6. A second internal battery 4C formed in thin plate shape is housed in the battery housing space 32.

In this way, by utilizing a cabinet 31 for common use with the portable information equipment 1 using the liquid crystal display 5 with backlight which requires the backlight and the portable information equipment 10 using a reflection type liquid crystal display 6 which does not require the use of backlight, it is possible to secure a battery housing space 32 in the display portion 30 for accommodating the second internal battery 4C. Thus, the capacity of the internal battery can be increased and, therefore, any externally attached extension battery is not necessary. Electric power requirement of the reflection type liquid crystal display 6 is far much smaller than that of the liquid crystal display 5 with backlight. Therefore, the useful life of battery is further extended and the utility of the portable information equipment 10 is substantially enhanced. Furthermore, the cabinet 31 of the display portion 30 and the associated components are commonized between the portable information equipment 10 using the reflection type liquid crystal display 6 and the portable information equipment 1 using the liquid crystal display 5 with backlight, whereby cost involved in assembling and manufacturing of the portable information equipment 10 can be curtailed.

Figure 3:
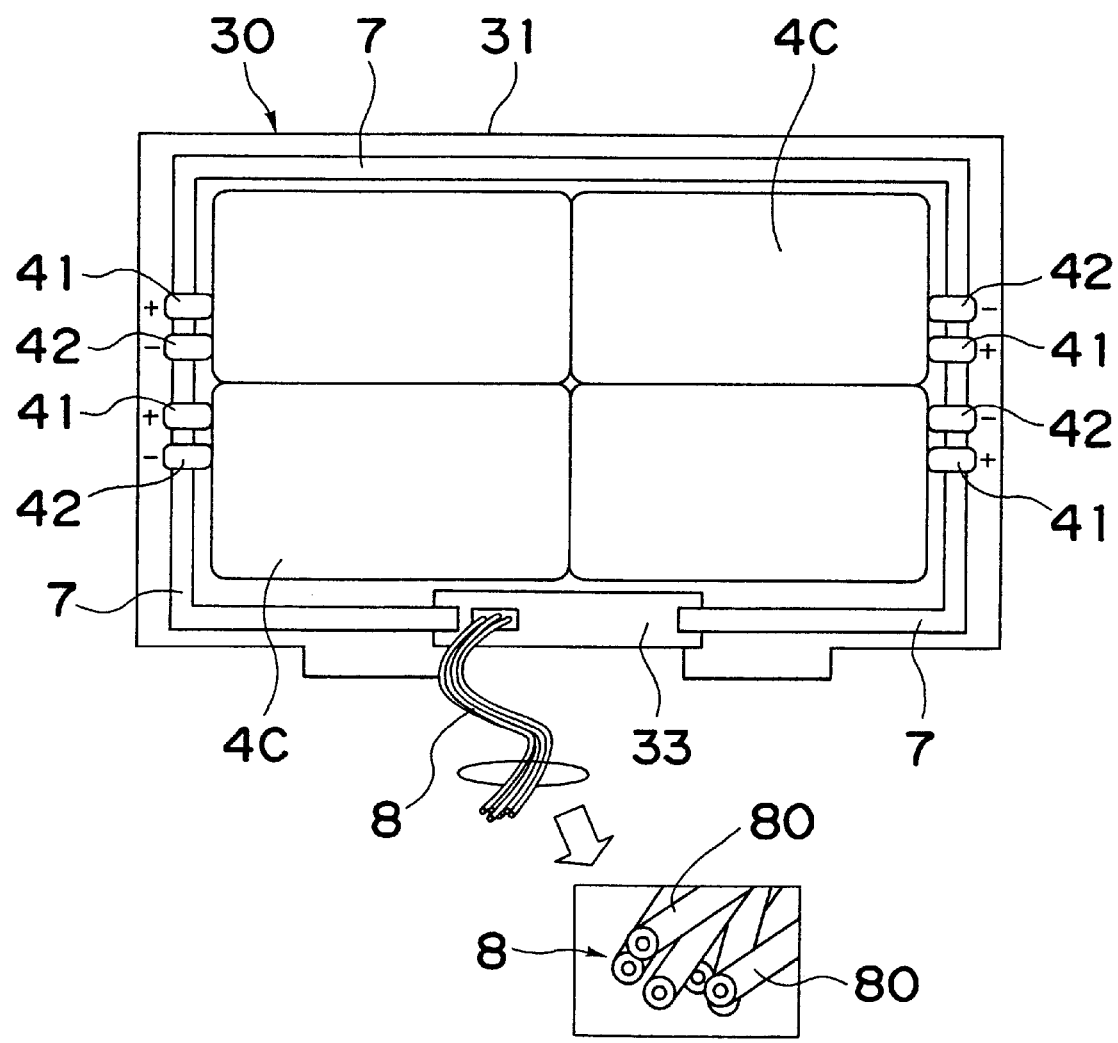
FIG. 3 is an explanatory view showing a top plan construction of an interior of the display portion of the portable information equipment of the present invention.
Figure 4:
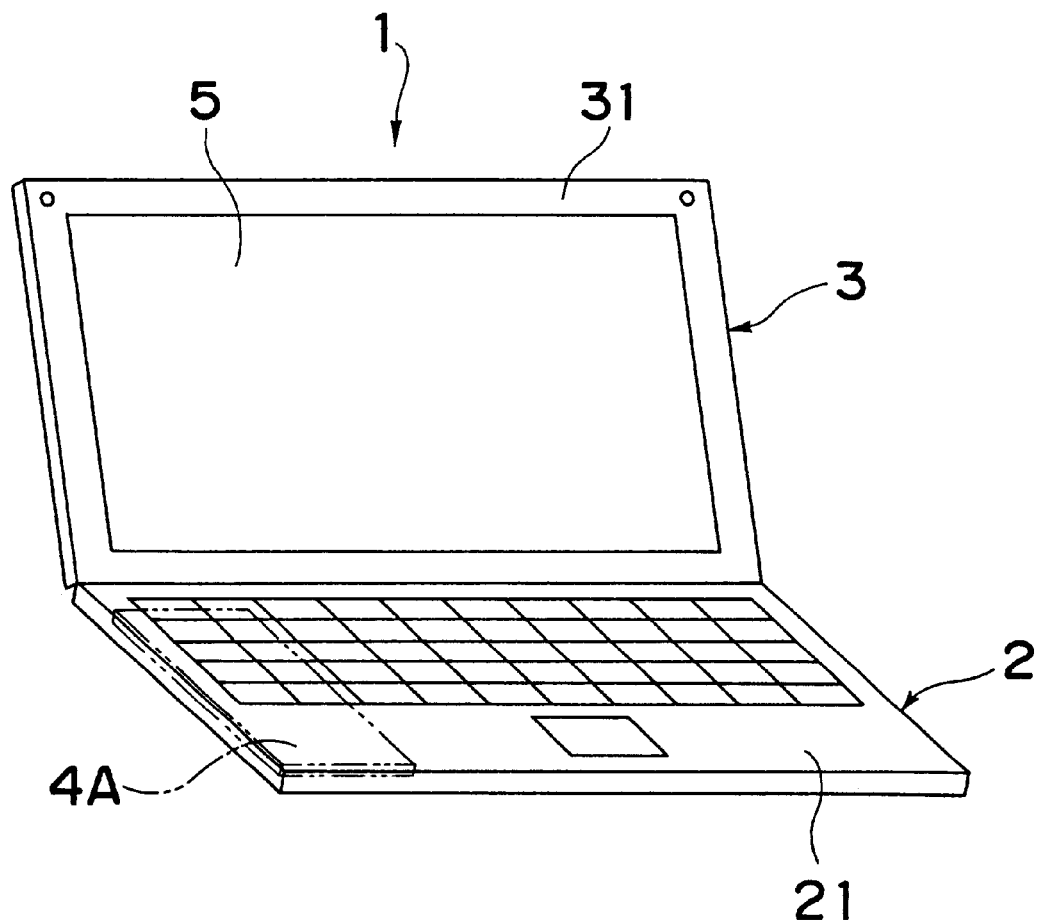
FIG. 4 is a perspective view showing a schematic construction of a conventional prior art portable information equipment.
Figure 5:
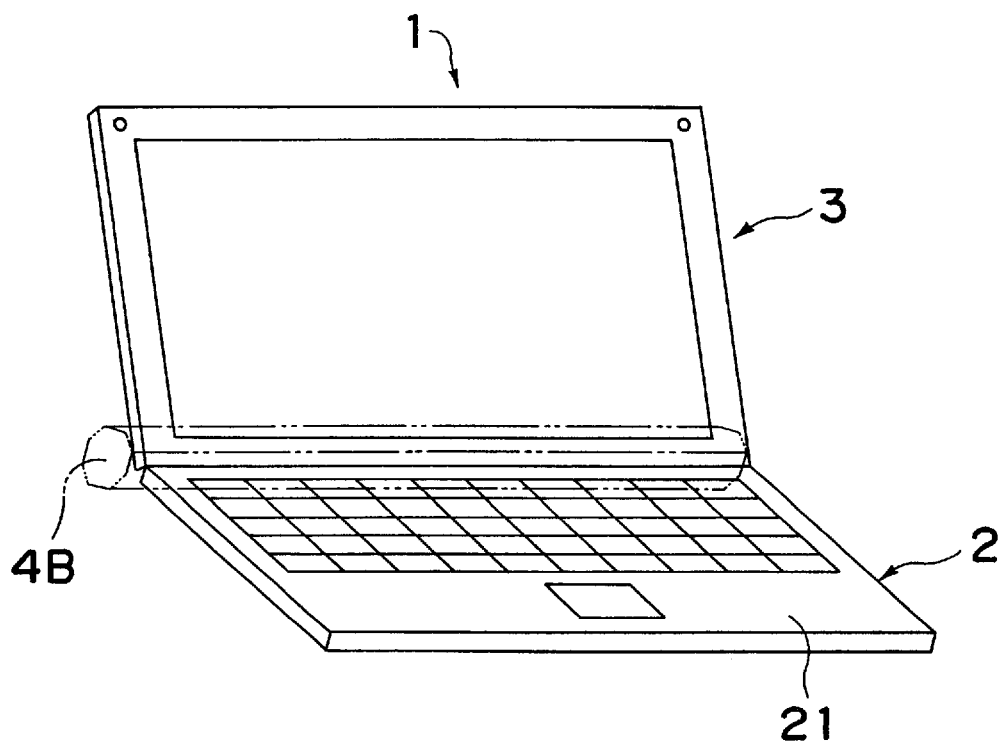
FIG. 5 is a perspective view showing the portable information equipment shown in FIG. 4 as fitted with an extension battery.

FIG. 3 shows a top plan view of the inside of the display portion 30 in the portable information equipment 10 of the above described arrangement. For example, in the case of a portable information equipment 10 having a 11.3 inch reflection type liquid crystal display 6 incorporated in the display portion 30, the external size of the display portion 30 is about 264 mm (in width)×about 207 mm (in length), and the size of display screen of the reflection type liquid crystal display 6 is about 230 mm (in width)×about 173 mm (in length). The size of a battery housing space 32 formed behind the reflection type liquid crystal display 6 is a few mm larger than the display screen in both width and length.

In this embodiment, a lithium polymer battery is used as a second internal battery 4C housed in the battery housing space 32. For example, one package of the lithium polymer battery 4C has a size of 114 mm (in length)×88.5 mm (in width)×3 mm (in thickness), four lithium polymer batteries 4C being arranged in the battery housing space 32. The package of the lithium polymer battery 4C has a positive terminal 41 and a negative terminal 42 both of which are connected to a battery control board 33 through flat type cables 7. For connecting the plural lithium polymer batteries 4C, several combinations in series and/or parallel is conceivable, but the combinations are not particularly defined in the present invention.

The battery control board 33 is similar in size to an inverter board (not shown) incorporated in the liquid crystal display 5 with backlight for lightening the backlight 54. Therefore, the battery control board 33 can be incorporated into the cabinet 31 without difficulty in the case where the cabinet 31 of the display portion 30 using the reflection type liquid crystal display 6 is common with the cabinet 31 of the display portion 3 using the liquid crystal display 5 with backlight.

FPC (flexible printed circuit) and FFC (flexible flat cable) are suitable for the flat cable 7. The FPC or FFC flat cable 7 is as thin as about 0.5 mm and has high flexibility, so that the FPC or FFC flat cable 7 can be easily incorporated in the cabinet 31 of the display portion 30 having limitations in thickness. Further, resistance of the FPC or FFC flat cable 7 is small, and therefore it is possible to flow a large current by widening the width of the flat cable 7.

The display portion 30 is connected to the main body portion 20 so as to be openable and closable with hinges (not shown). Therefore, in order to supply power from the second internal battery 4C housed in display portion 30 to the main body portion 20, a power supply cable 8 capable of feeding a large current is required. In the present embodiment, a power supply cable 8 consisting of plural independent slender electric wires 80 bundled together is used. Such a bundle of the electric wires 80 are connected at their ends to the battery control board 33 incorporated in the display portion 30. In the case where wires having a large diameter are used for the power supply cable 8, wire break or wire twist may occur in the course of repetitive opening/closing operations of the display portion 30. However, when the wires 80 are slender, possibility of wire break or wire twist can be minimized. Specifically, the thickness of the slender electric wire 80 is preferably is more slender than AWG (American Wire Gauge) #30.

As above described, according to the present invention, it is possible to incorporate a thin-plate second internal battery 4C into the display portion 30, by using the display unit 6 which requires no backlight in the display portion 30 to take advantage of the resulting thickness reduction, so as to increase the capacity and utility of the internal battery. Further, by using the cabinet 31 in common for the display portion 30 with no backlight and for the display portion 3 with the backlight 54, it is possible to reduce the costs involved in fabrication and assembly of the cabinet 31 and associated parts.

The display portion 30 is not particularly limited to the aforesaid reflection type liquid crystal display 6. Other display units such as EL (electroluminescence) display, plasma display and field effect display may be used as well.

The aforesaid lithium polymer battery 4C is particularly suitable for the second internal battery 4C, but other thin-type batteries adaptable for capacity increase may be used. Further, in case that the performance of the second internal battery 4C has been exceedingly improved to sufficiently secure a necessary battery with the second internal battery 4C alone, the first battery 4A to be housed in the main body portion 20 can be omitted.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A portable information equipment having a main body portion and a display portion foldably connected so as to be opened and closed, the display portion comprising:

a cabinet defining an outline of the display portion;

a display unit requiring no backlight unit and housed in the cabinet; and a platy internal battery housed in a space defined between the cabinet and the display unit.

2. The portable information equipment as set forth in claim 1, wherein the space is on a back side of the display unit in the cabinet.

3. The portable information equipment as set forth in claim 1, wherein the display unit is a reflection type liquid crystal display.

4. The portable information equipment as set forth in claim 1, wherein the platy internal battery is a lithium polymer battery.

5. The portable information equipment as set forth in claim 1, the display portion further comprising:

a battery control board provided within the cabinet; and a flat cable by which the battery control board is connected to the internal battery.

6. The portable information equipment as set forth in claim 5, wherein the flat cable is a flexible flat cable or a flexible printed circuit.

7. The portable information equipment as set forth in claim 1, the display portion further comprising:

a power supply cable for supplying electric power from the internal battery to the main body portion.

8. The portable information equipment as set forth in claim 7, wherein the power supply cable includes at least two independent electric wires in a bundle.

* * * * *

UNITED STATES PATENT AND TRADEMARK OFFICE
CERTIFICATE OF CORRECTION

PATENT NO. : 6,366,459 B1
DATED : April 2, 2002
INVENTOR(S) : Katagiri

It is certified that error appears in the above-identified patent and that said Letters Patent is hereby corrected as shown below:

<u>Title page,</u>
The (*) Notice: should be changed to read -- Subject to any disclaimer, the term of this patent is extended or adjusted under 35 U.S.C. 154(b) by 82 days. --

Signed and Sealed this

Eighteenth Day of June, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,366,459 B1 Page 1 of 1
DATED : April 2, 2002
INVENTOR(S) : Katagiri It is certified that error appears in the above-identified patent and that said Letters Patent is hereby corrected as shown below:

Title page,
Item [*] Notice, delete the phrase "by 0 days" and insert -- by 82 days --

Signed and Sealed this

Twenty-first Day of September, 2004

JON W. DUDAS
*Director of the United States Patent and Trademark Office*